United States Patent
Ayari et al.

(10) Patent No.: US 10,586,309 B2
(45) Date of Patent: Mar. 10, 2020

(54) DEPTH SENSOR NOISE

(71) Applicant: DASSAULT SYSTEMES, Velizy Villacoublay (FR)

(72) Inventors: Mohamed Amine Ayari, Velizy Villacoublay (FR); Vincent Guitteny, Paris (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 85 days.

(21) Appl. No.: 15/846,328

(22) Filed: Dec. 19, 2017

(65) Prior Publication Data

US 2018/0182071 A1 Jun. 28, 2018

(30) Foreign Application Priority Data

Dec. 28, 2016 (EP) .................................... 16306838

(51) Int. Cl.
*G06K 9/00* (2006.01)
*G06T 5/00* (2006.01)
(Continued)

(52) U.S. Cl.
CPC ............. *G06T 5/002* (2013.01); *G06N 3/04* (2013.01); *G06N 3/08* (2013.01); *G06T 7/75* (2017.01);
(Continued)

(58) Field of Classification Search
CPC .. G06T 5/002; G06T 7/75; G06T 7/85; G06T 2207/20081; G06T 2207/10028;
(Continued)

(56) References Cited

U.S. PATENT DOCUMENTS 8,213,680 B2 * 7/2012 Fitzgibbon ......... G06K 9/00335
348/169
8,565,485 B2 * 10/2013 Craig ................. G06K 9/00369
375/240.1
(Continued)

FOREIGN PATENT DOCUMENTS

CN       105657402 A      6/1916
WO    WO 2016/050290 A1  4/1916
(Continued)

OTHER PUBLICATIONS

Ankur Handa, et al.; "A Benchmark for RGB-D Visual Odometry, 3D Reconstruction and SLAM"; IEEE International Conference on Robotics & Automation (ICRA), Hong Kong Convention and Exhibition Center; May 31-Jun. 7, 2014; Hong Kong, China; 8 pgs.
(Continued)

*Primary Examiner* — Amir Alavi
(74) *Attorney, Agent, or Firm* — Oblon, McClelland, Maier & Neustadt, L.L.P.

(57) ABSTRACT

Described is a computer-implemented method for learning a function configured for reconstructing, for a class of real objects, a 3D modeled object that represents an instance of the class from a depth map of the instance. The method comprises providing a parametric model of the class, creating a database, and learning the function with the database. The method improves the 3D reconstruction of a real object from a depth map.

24 Claims, 5 Drawing Sheets
(3 of 5 Drawing Sheet(s) Filed in Color)

(51) Int. Cl.
| | |
|---|---|
| *G06T 7/73* | (2017.01) |
| *G06T 7/80* | (2017.01) |
| *G06N 3/08* | (2006.01) |
| *G06N 3/04* | (2006.01) |

(52) U.S. Cl.
CPC ...... *G06T 7/85* (2017.01); *G06T 2207/10028* (2013.01); *G06T 2207/20081* (2013.01); *G06T 2207/20084* (2013.01)

(58) Field of Classification Search
CPC . G06T 17/10; G06N 3/08; G06N 3/04; G06K 9/00362; G06K 9/6202; G06K 9/00201; H04N 13/0203; A61B 5/1077; A61B 5/1079; G06Q 30/0643
See application file for complete search history.

(56) References Cited

U.S. PATENT DOCUMENTS

| | | | |
|---|---|---|---|
| 8,711,206 B2* | 4/2014 | Newcombe | G06T 7/74 348/46 |
| 9,836,883 B2* | 12/2017 | Tran | B29C 64/386 |
| 9,959,455 B2* | 5/2018 | Young | G06K 9/00214 |
| 10,157,503 B2* | 12/2018 | Tran | G06T 19/006 |
| 2013/0251241 A1 | 9/2013 | Kunkel et al. | |
| 2015/0347846 A1 | 12/2015 | Abner Guzman-Rivera et al. | |
| 2016/0127715 A1 | 5/2016 | Shotton et al. | |
| 2017/0147874 A1* | 5/2017 | Perbet | G06K 9/00201 |
| 2018/0077400 A1* | 3/2018 | Ayari | H04N 13/271 |
| 2018/0182071 A1* | 6/2018 | Ayari | G06T 5/002 |
| 2019/0050682 A1* | 2/2019 | Sutic | G06K 9/6256 |

FOREIGN PATENT DOCUMENTS

| | | |
|---|---|---|
| WO | WO 2011/142734 A1 | 11/2011 |
| WO | WO 2013/1 89 05 | 12/2013 |

OTHER PUBLICATIONS

Ankur Handa, et al.; "Understanding Real World Indoor Scenes With Synthetic Data"; 2016 IEEE Conference on Computer Vision and Pattern Recognition; 9 pgs.
Andreas Ley, et al.; "SyB3R: A Realistic Synthetic Benchmark for 3D Reconstruction from Images"; ECCV 2016; Part VII; LNCS 9911; 16 pgs.
Michael J. Landau, et al.; "Simulating Kinect Infrared and Depth Images"; IEEE Transactions on Cybernetics, vol. 46, No. 12; Dec. 2016; 14 pgs.
Trapti Sahu, et al.; "Image Enhancement Based on Abstraction and Neural Network"; International Journal of Scientific Engineering and Technology; vol. No. 1, Issue No. 2; ISSN: 2277-1581; Apr. 1, 2012; 5 pgs.
Michael Gschwandtner, et al.; "BlenSor: Blender Sensor Simulation Toolbox"; Department of Computer Sciences; University of Salzburg, Austria; 11 pgs.
Avishek Chatterjee, et al.; "Noise in Structured-Light Stereo Depth Cameras: Modeling and its Applications"; arXiv:1505.01936v1 [cs.CV]; May 8, 2015; 31 pgs.
Amira Belhedi, et al.; "Noise Modelling and Uncertainty Propagation for TOF Sensors"; 10 pgs.
Benjamin Choo, et al.; "Statistical Analysis-Based Error Models for the Microsoft Kinect™ Depth Sensor"; Sensors 2014, 14, doi: 10.3390/s140917430; 21 pgs.
Chuong V. Nguyen, et al.; "Modeling Kinect Sensor Noise for Improved 3D Reconstruction and Tracking"; 2012 Second Joint 3DIM/3DPVT Conference: 3D Imaging, Modeling, Processing, Visualization & Transmission; 7 pgs.
Alex Krizhevsky, et al.; "ImageNet Classification with Deep Convolutional Neural Networks"; 9 pgs.
Matthew M. Loper, et al.; "OpenDR: An Approximate Differentiable Renderer"; Max Planck Institute for Intelligent Systems; Tubingen, Germany; 16 pgs.
Yinpeng Chen, et al.; "Tensor-Based Human Body Modeling"; CVPR2013 Is the Open Access Version Provided by the Computer Vision Foundation; 8 pgs.
Alexandru O. Balan, et al.; "The Naked Truth: Estimating Body Shape Under Clothing"; Department of Computer Science, Brown University, Providence, RI 02912, USA; 14 pgs.
Alexandru O. Balan, et al.; "Detailed Human Shape and Pose from Images"; 8 pgs.
Peng Guan, et al.; "Estimating Human Shape and Poser from a Single Image"; Department of Computer Science, Brown University, Providence, RI 02912; USA; 8 pgs.
Alexander Weiss, et al.; "Home 3D Body Scans from Noisy Image and Range Data"; Dept. of Computer Science, Brown University, Providence, RI, USA; Perceiving Systems Dept. Max Planck Institute for Intelligent Systems, Tubingen, Germany; 8 pgs.
Frank Perbert, et al.; "Human Body Shape Estimation Using a Multi-Resolution Manifold Forest"; Toshiba Research Europe, Cambridge, UK; 8 pgs.
Jamie Shotton, et al.; "Real-Time Human Pose Recognition in Parts from Single Depth Images"; Research Highlights; DOI:10.1145/2398356.2398381; Communication of the ACM; Jan. 2013; vol. 55; No. 1; 9 pgs.
Vladimir G. Kim, et al.; Data-Driven Shape Analysis and Processing; Article in Computer Graphics Forum; Feb. 2015; 28 pgs.
Neda Salamati, et al.; "Incorporating Near-Infrared Information into Semantic Image Segmentation"; arXiv:1406.6147v1 [cs.CV]; Jun. 24, 2014; 16 pgs.
Philipp Krahenbuhl, et al.; "Efficient Inference in Fully Connected CRFs with Gaussian Edge Potentials"; 9 pgs.
L. Hoegner, et al.; "Towards People Detection from Fused Time-of-Flight and Thermal Infrared Images"; The International Archives of the Photogrammetry, Remote Sensing and Spatial Information Sciences; vol. XL-3, 2014; ISPRS Technical Commission III Symposium; Sep. 2014; Zurich, Switzerland; 6 pgs.

\* cited by examiner

DEPTH SENSOR NOISE

CROSS-REFERENCE TO RELATED APPLICATIONS

This application claims priority under 35 U.S.C. § 119 or 365 to European Application No. 16306838.0, filed Dec. 28, 2016. The entire contents of the above application(s) are incorporated herein by reference.

FIELD OF THE INVENTION

The invention relates to the field of computer programs and systems, and more specifically to methods, programs and products related to the noise of a type of depth sensor.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

In this framework, depth sensors are currently involved in many applications such as 3D reconstruction, Augmented Reality, Human-Computer Interface and Video Games. Depth sensors provide depth information in real-time and at high frame rates. Main existing depth sensor technologies include Time of Flight (ToF) depth sensors and Structured Light (SL) depth sensors.

Time of Flight depth sensors measure the time-of-flight a light signal takes between the camera and the subject. This gives the depth of the subject at that point. These sensors are based on the emission of a modulated infrared light which is thereafter reflected by the objects in the scene. The signal's phase shift $\varphi$ is determined and thus the depth is computed by $$Z = \frac{c\varphi}{4\pi\omega},$$

where c is the speed of light and $\omega$ is the modulation frequency.

Structured Light depth sensors have one camera and one laser-based IR projector which form a stereo pair. The IR projector sends out a fixed grid light pattern on the subject which gives a distorted version of this grid, captured with the infrared camera. Depth is calculated by triangulating the distorted grid against the exact grid. For a new image, one wants to calculate the depth at each pixel. For each pixel in the IR image, a small correlation window (9×9 or 9×7) is used to compare the local pattern at that pixel with the memorized pattern at that pixel and 64 neighboring pixels in a horizontal window. The best match gives an offset from the known depth. In terms of pixels this is called disparity. Thus the depth is computed by $$Z = \frac{bf}{d}$$

where Z is the depth (in meters), b is the horizontal baseline between the camera and the projector (in meters), f is the focal length of the cameras (in pixels), and d is the disparity (in pixels).

While the low cost and ease of use of these sensors is highly appreciated, they suffer from a high level of noise. Some work has been devoted to improve this issue, for example by means of filtering/denoising technics applied to the noisy depth measurements, but at the time being no noiseless depth sensor is known.

Within this context, there is still a need for an improved solution with respect to the noise in measurements performed by depth sensors.

SUMMARY OF THE INVENTION

It is therefore provided a computer-implemented method for determining a function configured for adding a noise of a type of depth sensor to an input depth map.

The method comprises forming a learning dataset. The learning dataset includes a plurality of noiseless depth maps each associated to a respective noisy depth map. Each noiseless depth map and respective noisy depth map correspond to a same one of a plurality of depth sensor positionings in one or more scenes. The forming includes acquiring each noisy depth map with a physical instance of the type of depth sensor. The forming also includes virtually calculating each noiseless depth map. The method also includes learning the function based on the learning dataset.

In examples, the method may comprise one or more of the following:
- virtually calculating each noiseless depth map is based on the corresponding depth sensor positioning and on a predetermined model of the corresponding scene;
- the forming further includes determining the corresponding depth sensor positioning from the respective noisy depth map;
- the forming further includes determining the corresponding depth sensor positioning from the respective noisy depth map;
- determining the corresponding depth sensor positioning from the respective noisy depth map includes identifying in the respective noisy depth map a calibration object and/or a calibration pattern;

the plurality of depth sensor positionings includes one or more sub-pluralities of depth sensor positionings that each correspond to a respective depth from a same scene region;

each sub-plurality of depth sensor positionings that each correspond to a respective depth from a same scene region includes more than 10 depth sensor positionings, preferably more than 50 depth sensor positionings;

the plurality of noisy depth maps forms one or more videos;

learning the function is performed by regression learning;

learning the function is performed within a space of networks comprising convolutional layers and/or deconvolutional layers; and/or the convolutional layers and/or deconvolutional layers implements filters each of a size inferior to 10×10, preferably inferior to 5×5, preferably equal to 3×3.

It is further provided a function learnable according to any of the above provided methods. The function may be learnt according to the above method. The function is provided as a data structure.

The data structure may be recorded on a data storage medium.

It is further provided a computer-implemented method for generating a depth map based on a depth sensor positioning in a scene and on a predetermined model of the scene. The method comprises virtually calculating a noiseless depth map based on the depth sensor positioning and on the predetermined model of the scene. The method also comprises applying, to the calculated noiseless depth map, the above provided function.

It is further provided a computer program comprising instructions for performing any one or any combinations of the above provided methods.

It is further provided a product comprising a memory having stored thereon the above function and/or the above computer program.

The product may consist of said memory and thereby form a data storage medium.

The product may alternatively comprise other elements, such as a processor coupled to the memory and thereby form a computer system.

In examples, the system may further comprise a depth sensor, e.g. the processor being coupled to the depth sensor, for example via a (e.g. wireless) network.

BRIEF DESCRIPTION OF THE DRAWINGS

Embodiments of the invention will now be described, by way of non-limiting example, and in reference to the accompanying drawings, where.

Figure 1:
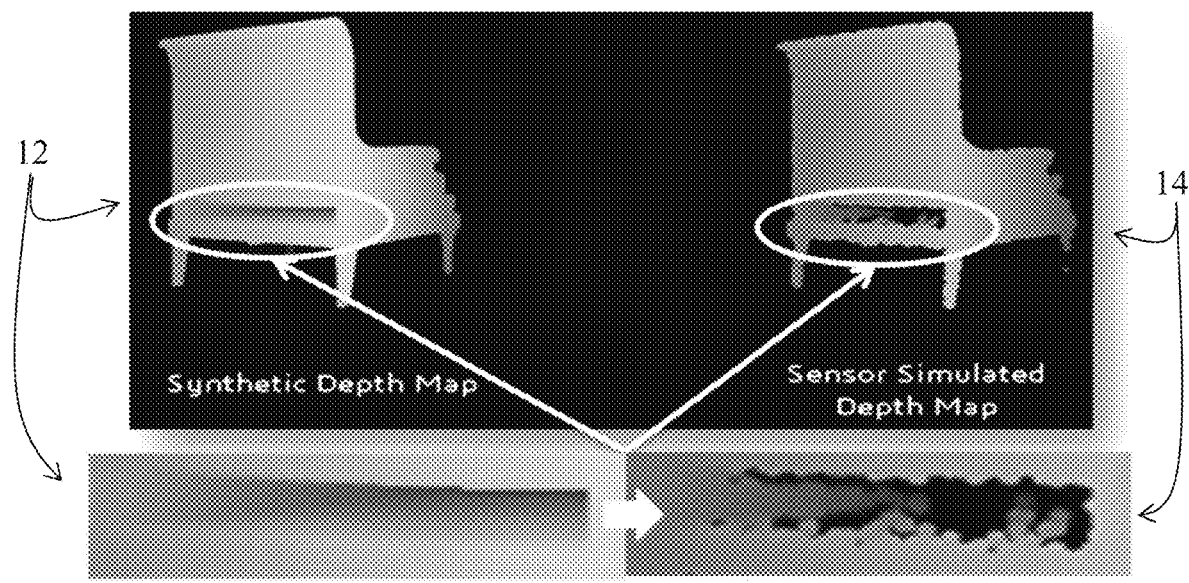
FIGS. 1 and 2 illustrate the provided solutions.

The patent or application file contains at least one drawing executed in color.

Copies of this patent or patent application publication with color drawing(s) will be provided by the Office upon request and payment of the necessary fee.

DETAILED DESCRIPTION OF THE INVENTION

It is provided a computer-implemented method for determining a function, which function is configured for adding a noise to an input depth map. The method may be referred to as the "learning method" or "offline" mode or method.

It is further provided a function learnable according to the learning method, that is, a data structure (e.g. recordable on a storage medium) corresponding to the function outputted by the learning method. In an example, the function is effectively learnt according to the learning method. The function may be referred to as the "noise-adding function".

The added noise is the noise of a type of depth sensor. Depth sensors present imperfections such that, when acquiring depth data (i.e. performing/capturing depth measurements), their outputted depth maps depart (e.g. at least slightly) from the exact expected result. The difference between the exact expected result and the real acquisition is called "noise". Real depth maps are "noisy" depth maps as opposed to exact depth maps which are by definition "noiseless". For example, a noiseless depth map capturing an object having a perfectly sharp and straight edge would feature a perfectly straight segment corresponding to the sharp and straight edge, whereas a noisy depth map capturing the same object would feature a generally straight yet not-perfectly straight geometry corresponding to the same sharp and straight edge.

The expression "type of depth sensor" designates a category of depth sensors of a similar or an at least substantially same constitution, such that they present a similar or an at least substantially same noise. For example, depth sensors of a given category present a noise that follows a same probability distribution $f_\beta$, where $\beta$ designates the parameters of the function.

A physical instance of a type of depth sensors may be any depth sensor falling within such category. The depth sensors of the category may present the same physical parameters and calibration parameters, be a same model of a same brand, have been produced by a same constructor, and/or have been produced on a same production line by instances of the same manufacturing operations. The more restricted the category is, the more accurate the learnt noise-adding function is with respect to all the physical instances of the category.

In examples, the learning method is for determining a function configured for adding a noise of a given depth sensor to an input depth map, and each acquisition of a noisy depth map included in the forming is performed with said given depth sensor. In other words, the type of depth sensor is reduced to one given depth sensor, such that the only physical instance of the type of depth sensor available is that given depth sensor itself. In such a case, the noise-adding function is particularly accurate with respect to said given depth sensor, and it is also accurate with respect to depth sensors of a similar or an at least substantially same constitution as said given depth sensor, such that they present a similar or an at least substantially same noise.

In examples, the learning method is for determining a function configured for adding a noise of any one of a predetermined plurality of depth sensors to an input depth map, said predetermined plurality being determined in any way and for example preselected by a user, and each acquisition of a noisy depth map included in the forming is performed with one of said predetermined plurality of depth sensors, each depth sensor of said predetermined plurality of depth sensors being involved for at least one such acquisition. In such a case, the noise-adding function simulates an average noise with respect to said predetermined plurality of depth sensors, and the noise-adding function is accurate with respect to said predetermined plurality of depth sensors to the extent that the noises they present are similar one to another.

The learning method comprises forming a learning dataset. As known per se, a learning dataset is a dataset that associates (e.g. one-to-one) values of one type of data to values of another type of data. A learning dataset is configured for performing a (e.g. machine-) learning of a function that transforms any value of the one type (or respectively of the other type) into a corresponding value of the other type (or respectively of the one type), the correspondence operated by the learnt function respecting the initial association. The initial association may be in accordance with a real correspondence between the associated data (that is, a correspondence according to a physical association), and the learning dataset may be configured in terms of data quantity and/or variability (i.e. diversity) for the learnt function to accurately convey such real correspondence in substantially, e.g. the term "accurately" designating a mistake rate below a predetermined value.

In the present case the learning dataset formed by the learning method includes in specific a plurality of noiseless depth maps. Each noiseless depth map is associated to a respective noisy depth map. For example, the learning dataset may comprise a plurality of noiseless depth maps, each noiseless depth map pointing to a respective noisy depth map.

The learning method comprises learning the function based on the learning dataset. Any learning technique may be implemented. In examples, the learning dataset is divided in a training dataset and a testing dataset, and occurrences of a sequence formed by a training phase following by a testing phase are performed until the testing phase is satisfying (e.g. the testing phase meets a validation criterion). In other examples the learning dataset constitutes the training dataset, e.g. and there is no testing phase or alternatively the testing phase is performed on other data.

The learnt noise-adding function is thus one configured for transforming any noiseless depth map into a corresponding noisy depth map in accordance with the learning dataset. In other words, applying the learnt noise-adding function to a given noiseless depth map of the learning dataset in specific would lead to a result at least close to the respective noisy depth map associated to the given noiseless depth map in the dataset, e.g. below a predetermined distance threshold.

Each noiseless depth map and its respective noisy depth map correspond to a same depth sensor positioning of a plurality of depth sensor positionings. The plurality of depth sensor positionings consists of depth sensor positionings each located in one of one or more scenes. In other words, a depth sensor positioning consists of a location and an orientation of the depth sensor in a scene. The term "scene" designates any environment which features distinguishable elements, such as an architectural or urban environment featuring for example buildings, streets and/or people, or a building interior environment (such as a room) featuring for example objects such as walls, glasses, and/or movable objects.

The learning method is particularly efficient in building interior environments, as such scene offer a good diversity of information. The one or more scenes may thus include one or more building interior environment scenes. One or more of the building interior environment scenes may include objects of (e.g. at least two or five) different orders of size (e.g. different orders of size between two objects meaning that one object is at least five, ten or twenty times the volume of the first object) and/or of (e.g. at least two or five) different materials and/or of (e.g. at least two or five) different colors.

Because each noiseless depth map and its respective noisy depth map in the learning dataset correspond to a same depth sensor positioning, both are supposed to provide the same depth representation of a same scene region (that is precisely the region corresponding to the caption available with the positioning common to both depth sensors), with the exception that the noisy depth map features noise while the noiseless depth map provides an exact representation. This way, the learning dataset allows an accurate learning of the noise-adding function.

The represented scene may be exactly the same for both the noiseless noisy depth map and its respective noisy depth map (e.g. for the whole learning dataset). By "exactly the same" it is meant that exactly the same elements are present in both representations. Alternatively, some slight differences may be present, yet not compromising the learning. For example, some elements present in the scene represented by the noisy depth map may be absent from the scene represented by the noiseless depth map, and/or inversely. In such a case, the method may comprise identifying such differences and processing them in any way, for example by reducing the scene to the maximal set of elements common to both representations. This is a mere matter of implementation.

The forming includes (physically) acquiring each noisy depth map with a physical instance of the type of depth sensor. A same and unique physical instance of the type of depth sensor may be used throughout the method. Such acquisition may be particularly ergonomic. In alternatives, several instances may be used.

In examples, the acquisition of all noisy depth maps may be substantially continuous. For example, a user may handle a depth sensor—e.g. via any device including a depth sensor (such as a depth camera)—and move around while substantially continuously capturing depth maps, possibly with a few interruptions during the process. Each caption may be a video caption, that is, the user launches a video caption command and then simply moves around, each depth map being acquired automatically. The plurality of noisy depth maps may thus form one or more (successive) video(s). Such acquisitions may be particularly ergonomic.

Although not necessary for that, the acquisition of a video allows an ergonomic acquisition of several images each at a respective depth from a same scene region, thereby including to the learning dataset a sub-plurality of depth sensor positionings that each correspond to a respective depth from a same scene region.

A scene region is a part of a scene. By positioning a depth sensor at different depths (i.e. distances) of a same region, the depth sensor being each time oriented toward the region, one can acquire several images of the same elements of the scene (which are precisely the elements inside the region) at different depths.

This allows a redundancy of information, which is of particular benefit in the context of the learning method. Indeed, the noise of the type of depth sensor is a physical value which behaves randomly with respect to such acquisition repetitions, such that the repetitions allow forming a learning dataset which in turn allows learning the noise particularly well.

This can be implemented easily by a user holding a depth sensor device and turning the device around the scene region and/or approaching the device toward the scene region and/or backing the device from the scene region, e.g. in a continuous and smooth manner.

More than 10, preferably 50, acquisitions at different depths from a same scene region offer a good quantity of information. The number of acquisitions can also be kept under a maximal value (e.g. 10.000 or 1.000) to reduce the acquisition time, and for example be of the order of magnitude of 100.

In examples, the set of depths corresponding to the whole set depth images of the learning dataset includes values spread on substantially the whole range of depths allowed by the type of depth sensor. For example, if the type of depth sensors allows acquisitions (e.g. of a quality above a predetermined threshold) between depth values $d_{min}$ and $d_{max}$, then the learning dataset—by self-imposed constraint—does not feature any range $[d_1,d_2]$ of a size $d_2-d_1$ higher than $(d_{max}-d_{min})/k$ and with no corresponding depth image inside, where k equals 4, 8 or 16. This allows a high diversity of information in the learning dataset.

Also, a number N of scene regions higher than 2, 3 or 5 may be contemplated (e.g. the N regions being all spread in a number of scenes equal to 1 or higher than 2, 3 or 5), to provide a good variability of information. The number of scene regions may also be kept under a maximal value (e.g. 100 or 50), and for example be of the order of magnitude of 10.

In the following, the notions of "scene" and "scene region" may be confounded, as by definition of such notions, one may always define a scene as a scene region.

The forming also includes virtually calculating each noiseless depth map. In other words, each noiseless depth map is determined fully based on numeric data, that is, without any physical acquisition. Each virtual calculation may be based on the corresponding depth sensor positioning (i.e. the depth sensor positioning of the acquisition of the noisy depth map to be associated to the noiseless depth map in the learning dataset). For example, each noisy depth map acquisition may launch the virtual calculation of the noiseless depth map to the same positioning (e.g. real-time or for later performance via a program).

In examples, the virtual calculation of the noiseless depth map is based on a predetermined model of the corresponding scene (i.e. the scene corresponding to the depth sensor positioning of the acquisition of the noisy depth map to be associated to the noiseless depth map in the learning dataset). The model of the scene is any dataset representing the scene and from which a depth map may be computed, for example a representation of the 3D geometry of the scene. Such computation may be performed in any classical way and is not discussed here. The model of the scene may be provided in any way, for example by a user (e.g. the same user who handles the physical instance depth sensor) or retrieved automatically from a library.

The noise-adding function may be applied to any input depth map. However, application of the noise-adding function is most relevant when the input depth map is noiseless.

It is thus further provided a computer-implemented method for generating a depth map that comprises application of the noise-adding function to an input noiseless depth map. Such a method may be referred to as "noise-adding method" or "online" mode or method.

The noise-adding method comprises virtually calculating a noiseless depth map. The calculation is based on the depth sensor positioning and on the predetermined model of the scene. The noise-adding method further comprises applying the noise-adding function to the calculated noiseless depth map.

The noise-adding function and noise-adding method thereby allow generating a noisy depth map, where the noise corresponds to the type of depth sensor used in the learning method. The noise-adding method performs a virtual synthetization of a noisy depth map. The noise-adding method outputs—e.g. fully digitally, i.e. with no real measurement at all—a depth map relatively close to the depth map that would be outputted by a real measurement performed with a physical instance of the type of depth sensor. Based on a noise-adding function corresponding to a given type of depth sensor and on a predetermined model of a given scene, the noise-adding method thus simulates the behavior of a depth sensor of said given type in said given scene.

It is further provided a depth map obtainable by the noise-adding method, that is, a data structure corresponding to the depth map outputted by the noise-adding method. The depth map is thereby noisy and may be referred to as "noise-added depth map".

It is further provided a simulation process that simulates a real-world process which involves one or more real-world acquisitions of a depth map with a depth sensor of a given type in one or more scenes, such as an automatic vehicle driving process. The simulation process may comprise providing one or more noise-added depth maps obtainable by a noise-adding method based on the given type of depth sensor and on a predetermined model of each of the one or more scenes.

The provided methods, programs, data structures, mediums and systems improve the virtual generation of a depth map, notably by implementing the machine-learning paradigm in such a context and thereby achieving advantages thereof.

Referring to FIG. 1 which shows the example of a chair, the provided methods, programs, data structures, mediums and systems allow the virtual generation of a noisy depth map 14 from a virtually calculated noiseless depth map 12.

Figure 2:
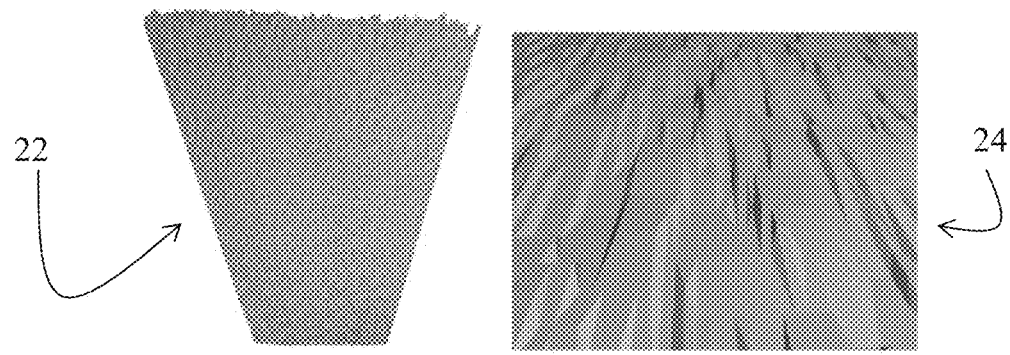

The provided methods, programs, data structures, mediums and systems may relate to the field of 3D Depth Camera Simulation and be applied to simulate a real (depth) camera depth stream by modeling the camera acquisition noise. Such a noise is illustrated by FIG. 2 which shows a scan 22 of a plane and a zoom 24 at a noise level of the same plane. Knowing the camera noise model, one can then emulate its behavior on synthetic depth data.

The provided methods, programs, data structures, mediums and systems have many applications, for example in every machine learning based application through 3D sensor training data augmentation by artificially generating realistic training data from the synthetic one, e.g. in Autonomous Driving Simulators.

Existing prior art on noise sensor modeling can be found in the literature related to depth sensors. There has indeed been some work on modeling the depth sensor noise, such as for example:

Paper "M. Gschwandtner, R. K. (2011). BlenSor: Blender Sensor Simulation Toolbox. *Advances in Visual Computing: 7th International Symposium*. Las Vegas, Nev., USA" which proposes Blensor, a sensor simulation framework that simulates the depth acquisition technologies ToF and SL. Depending on the sensor's technology, Blensor simulates the whole acquisition pipeline for each one. For example, for ToF sensor, Blensor raycasts a set of signals and adds a random gaussians noise uniformly on the distance traveled of each one. One can notice that this uniform noise distribution remains very simplistic.

Paper "Chuong V. Nguyen, S. I. (2012). Modeling Kinect Sensor Noise for Improved 3D Reconstruction and Tracking. *3DIM/3DPVT*" which proposes an empirically derived noise model using experimental analysis of the depth measurements. The paper models the noise as a function of both distance and the pose of the sensor. The experimental setup measures the lateral and axial noise probability distributions from depth measurements of a rotating plane on 1000 different depth map measured at both: each depth levels (ranging from 0.4 to 3.0 meters) and at each varying rotation angles. The authors find that the lateral noise does not vary significantly with the depth. In contrast, the axial noise clearly increases with the depth and specifically follows a quadratic function of the depth measures.

Paper "Avishek Chatterjee, V. M. (2015). Noise in Structured-Light Stereo Depth Cameras: arXiv: 1505.01936." which studies the SL noise characteristics and define by hand a theoretical model that estimates the noise as quadratic function of the depth. The authors validate this theoretical model by empirical depth measures.

Paper "Amira Belhedi, A. B.-B. (2012). Noise Modelling and Uncertainty Propagation. *ECCV*." which characterizes the ToF noise distribution as Gaussian and show that its standard deviation varies according to the pixel position and the depth. The authors propose to use a 3D thin-plate-spline as a noise's standard deviation model. This noise model is based on the study of the variation of depth pixel measurement; at each depth level 100 depth maps are recorded. According to those values, the authors conclude on the normality of noise. The authors model the noise variance as a function of the pixel position and the depth. They conclude that the noise variance increases away from the image center to the boundaries and the highest accuracy is measured at the image center. The noise variance is modeled by a 3D Thin-Plate-Spline smoothing function.

Such existing depth sensor modeling methods lack of:
Accuracy, as they need to model the physical acquisition process which is hard to model. In most cases, they use a very simplistic physical acquisition model based on experimental measures that lack of precision; and
Generality, as they need to model each depth sensor's acquisition pipeline aside for each new type of depth sensor.

The provided methods, programs, data structures, mediums and systems overcome these two limitations.

First, the provided learning method is more accurate because it does not need to mathematically specify the physical noise model. One can let the machine learn by itself the model directly from the data. As opposed to existing modeling methods, the provided learning method relies on an adequately built learning dataset.

Second, the provided learning method offers a general pipeline that works for every depth sensor. The provided learning method thereby eliminates any need to mathematically model the noise for every sensor. The pipeline is the same and one may limit themselves to change the learning dataset according to the type of depth sensor whose noise is to be learnt.

Furthermore, unlike existing algorithms, the noise-adding method is faster and achieves real-time performance as the mapping between the real and the synthetic spaces is already learnt offline.

The provided methods, programs, data structures, mediums and systems learn to simulate any depth sensor. Instead of modeling the physical depth acquisition pipeline using signal propagation and reflection physics, example approaches bypass this step and learn directly the shift between the space of synthetic and real "noisy" depth maps.

Starting from a learning dataset of real and synthetic depth maps, an example method learns the mapping function between the two modalities via deep learning technics. As discussed later, convolutional Neural Network (CNN) techniques are particularly efficient in this context.

Figure 3:
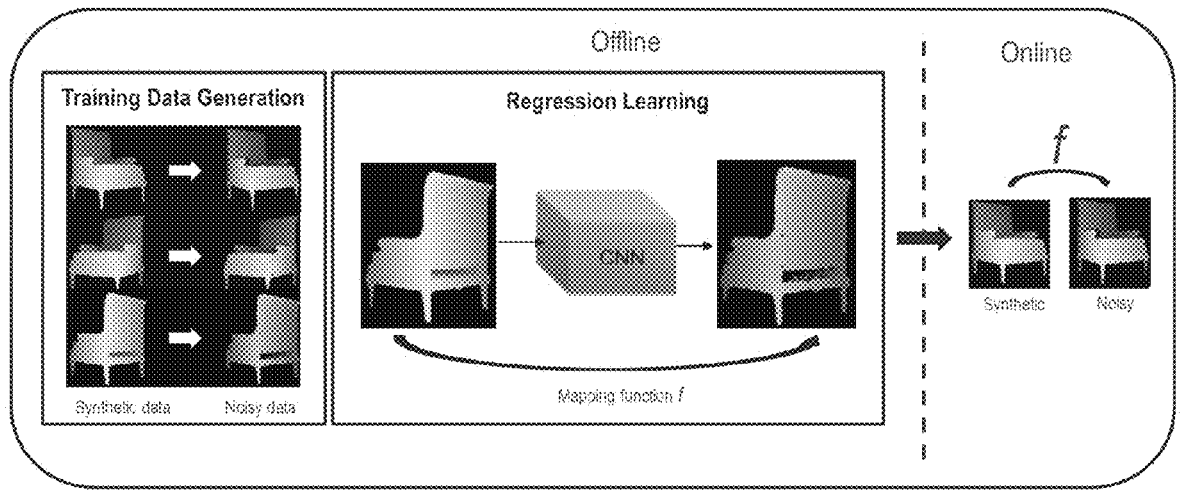
FIG. 3 shows an example of a pipeline of the provided solutions.

This processing is done offline. Once the mapping function between the synthetic and the real is learned, one can use it directly in an online manner to map the synthetic depth data to the real one. This pipeline is illustrated by FIG. 3.

The learning method may in examples be composed of two main steps:
1. Learning dataset generation.
2. Regression learning.

Examples of Learning Dataset Generation are now discussed.

The first step of the approach is to generate a set of real and synthetic depth maps. Using a depth sensor (e.g. the real depth sensor one would like to simulate), one can scan N well-chosen scenes i.e. 3D known geometry, on n different viewpoints. One may put a still discriminative 3D calibration object (for example 3D chessboard) and/or a 2D calibration pattern while scanning the scenes and make it always visible to the camera. This may be used to compute the 3D pose of the camera at each key viewpoint so as to synthetize the corresponding noiseless depth map, by identifying in an acquired depth map said calibration element. An alternative of using the 3D calibration object, for estimating the camera pose, may be to use the direct matching between the known 3D scene and the scanned one if the scene is textured/discriminative enough. It is noted that this may not work if one tries to match planer objects for example. An alternative to scenes with 3D objects would be to scan, at different depth levels, a white wall with a 2D pattern pasted on it (e.g. a chessboard).

Figure 4:
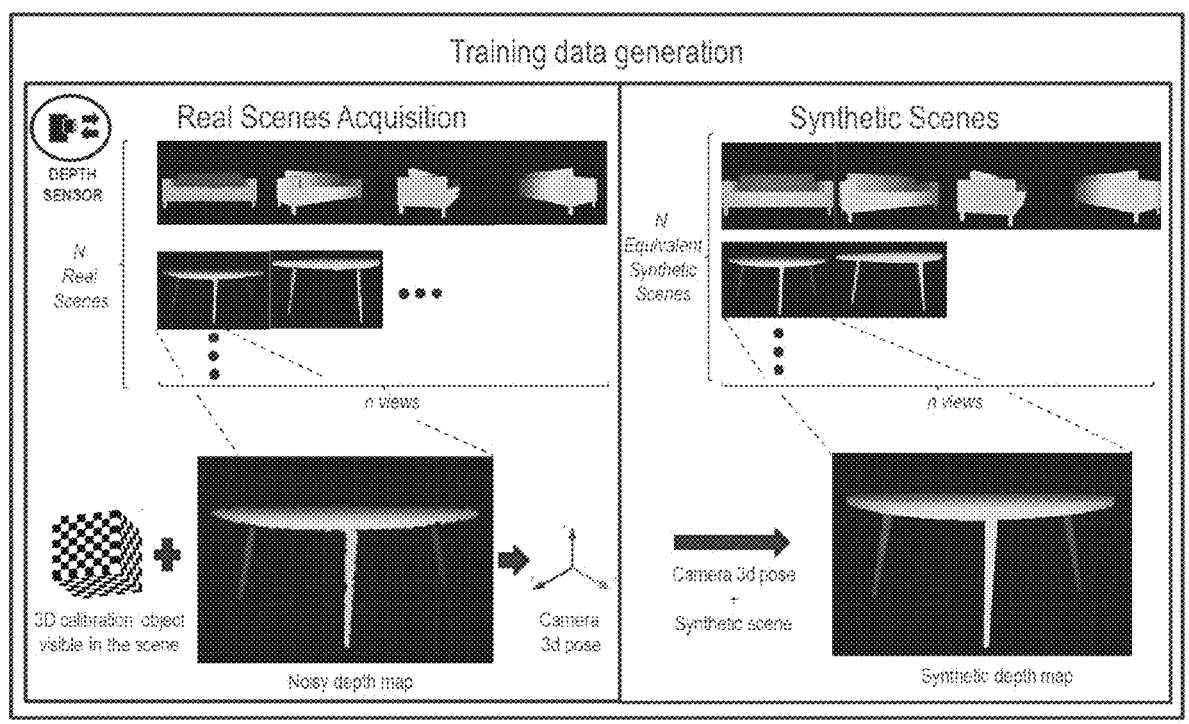
FIG. 4 shows an example of forming the learning dataset.

FIG. 4 shows a learning Database Generation Chart in line with the example.

Knowing each viewpoint camera pose, the learning method may apply this same pose to the virtual scene's camera using the same real camera intrinsic parameters. The learning method may then extract a synthetic depth map at each view point. The set of real and their corresponding synthetic depth maps may constitute the learning dataset.

Figure 5:
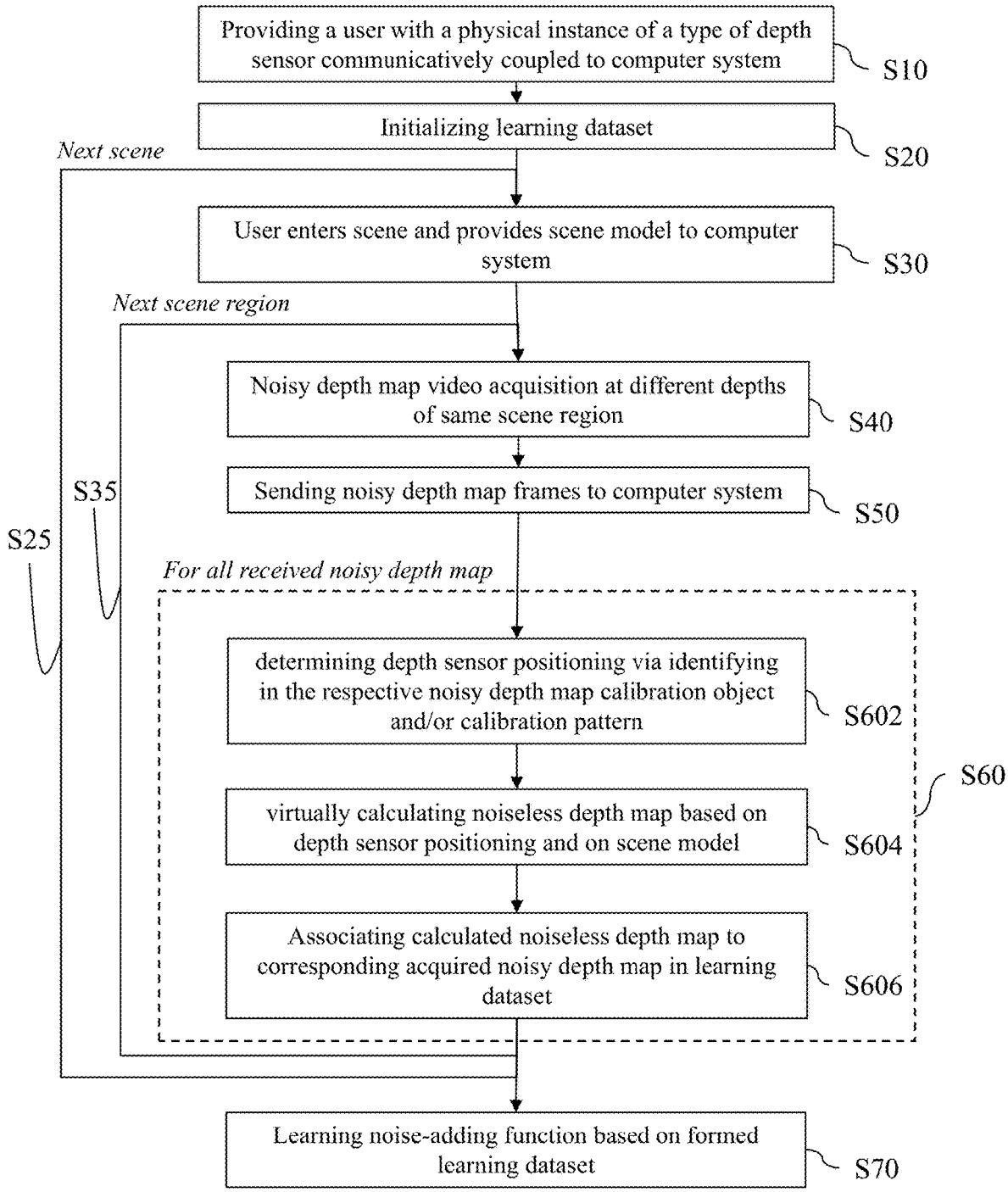
FIG. 5 shows a flowchart of an example of the learning method.

FIG. 5 shows a flowchart of an example of the learning method.

A user is provided at S10 with a depth sensor communicatively and wirelessly coupled to the processor of a computer system. The depth sensor is physically attached to the user, for example carried in his/her hands or attached to his head. Alternatively, a robot device may perform the method. In other examples, several instances of a same model of depth sensors may be provided at S10, for example to several users. Instances of the method of FIG. 5 may then in examples be performed in parallel.

The user launches at S20 a function to start the learning method, such that this initializes the learning dataset. This triggers a scheme S30-S60 implemented for one or more scenes. The flowchart of FIG. 5 shows a feedback S25, but the learning method may also be implemented for a single scene.

For each scene, the user enters at S30 the scene and provides a scene model to the computer system. The scene model may alternatively be acquired automatically by the computer system, at S30 or later such as upon S40, via retrieval, for example from a database and based on depth measurements.

The example of the learning method then comprises a scheme S40-S60 performed for one or more scene regions. The flowchart of FIG. 5 shows a feedback S35, but the learning method may also be implemented for a single scene region.

For each scene region, the user approaches the scene region and continuously acquires a depth video of the region (e.g. turning around the region, approaching the region and/or stepping back from the region). This operates an acquisition S40 at different depths of a same scene region. The video acquisition may be stopped or kept on between scene regions. The acquired depth map frames are sent at S50 (e.g. automatically) to the computer system.

The method then comprises a scheme S60 performed for all received noisy depth map. Instances of scheme S60 may be performed iteratively (i.e. sequentially) and/or in parallel.

Scheme S60 may be performed automatically by the computer system. Scheme S60 comprises determining S602 depth sensor positioning. This may be performed via identifying in a respective received noisy depth map a calibration object and/or a calibration pattern as discussed earlier. Scheme S60 may then calculate S604 fully virtually the noiseless depth map corresponding to the respective noisy depth map, based on such positioning and on the provided scene model (which, again, may have been previously provided by the user or retrieved automatically by the system, or which may be retrieved at this or any point based on depth maps sent and received at S50). Scheme S60 concludes formation of the learning dataset by associating at S606 calculated noiseless depth maps each to its corresponding acquired noisy depth map.

Eventually, the method of FIG. 5 learns the noise-adding function at S70 based on the formed learning dataset, in any way.

Figure 6:
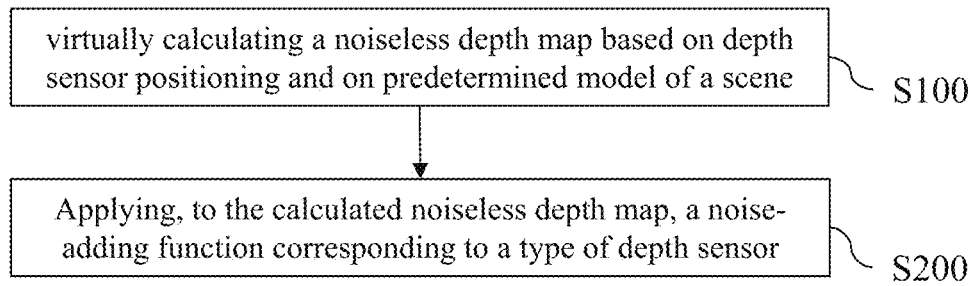
FIG. 6 shows a flowchart of an example of the noise-adding method.

FIG. 6 shows a flowchart of an example of the noise-adding method.

The noise-adding method of FIG. 6 comprises virtually calculating S100 a noiseless depth map based on depth sensor positioning and on predetermined model of a scene. This may be triggered by a user or within a simulation process to simulate depth data acquisition. The predetermined model and a depth sensor positioning within said model may be provided in any way. The method then comprises applying S200, to the calculated noiseless depth map, a noise-adding function previously learnt and corresponding to the contemplated type of depth sensor.

Examples of the function-learning step (e.g. S70) of the learning method are now discussed.

Learning the noise-adding function may be performed by regression learning. Such well-known learning can be performed simply and is thus fast and robust.

Learning the noise-adding function may notably be performed within a space of (e.g. neural) networks comprising convolutional layers and/or deconvolutional layers. In other words, the learning (e.g. S70) is configured to search a network made of a number (e.g. more than two, for example three or four) of convolutional layers that encode a signal—i.e. a noiseless depth map of the learning dataset—(e.g. and or followed by) a (e.g. same) number corresponding deconvolutional layers that decode the encoded signal. The encoding-decoding pipeline is configured to add the depth noise.

As known per se, the learning varies free parameters to perform the search. In examples, the number of layers, the sequence of layers (e.g. a fixed and predetermined number of convolutional layers, for example three or four, and then a same number of deconvolutional layers), and/or the number and size of filters implemented by each layers (e.g. 90 filters by layers and/or filters each of size 3×3) may all be fixed parameters of the learning. The (e.g. only) free parameters of the learning may then be the coefficients inside the filters.

Convolutional layers allow a good extraction of local features, which is well-adapted for learning the noise in depth maps. Indeed, depth noise is at least most often a local perturbation in depth maps. The convolutional layers and/or deconvolutional layers may for example implement filters each of a size inferior to 10×10, preferably inferior to 5×5, preferably equal to 3×3. This allows a particularly good locality of the extraction of features, and thus an accurate and efficient learning.

Figure 7:
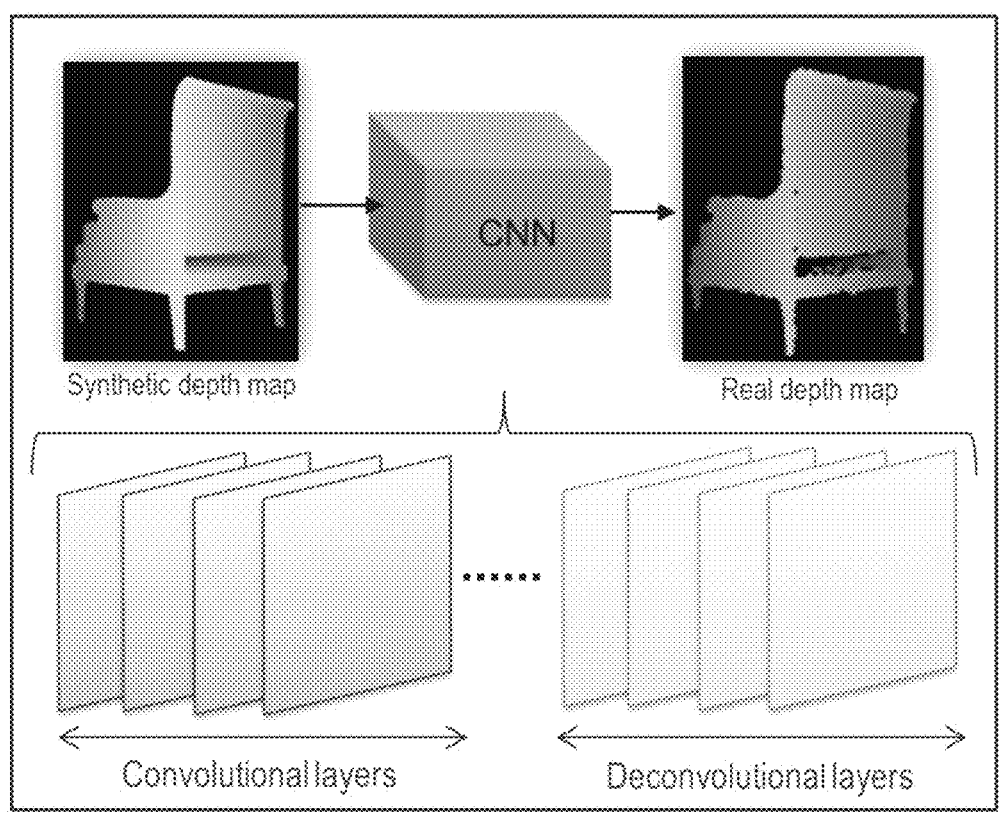
FIG. 7 shows an example of regression learning.

Such regression learning examples are now further discussed with reference to FIG. 7.

The learning model may be an end-to-end deep learning based neural network model. Such a network is well designed for this specific task of encoding/decoding a depth map image. The network may be learned to produce a noisy depth map from a synthetic one.

The network may be composed of a chain of symmetric convolutional and deconvolutional layers. The convolutional layers serve as features extraction and depth map encoding part, while the deconvolutional layers serve as a decoder and a depth map reconstruction part.

The layers pipeline may be fully convolutional with no pooling layers. The learning may employ small convolutional receptive fields to cover small image variations and thin noisy contour areas.

One may train the network in a fully supervised manner using back propagation of the Euclidean loss L between the real and the synthetic depth maps:

$$L = \frac{1}{2wh}\sum_{i=1}^{w}\sum_{j}^{h}\|\hat{D}_{ij} - D_{ij}\|$$

Where $\hat{D}$, $D$ are the noisy and the synthetic depth map images.

Each model of a scene may be a 3D modeled object, for example a CAD object.

A modeled object is any object defined by data stored e.g. in the database. By extension, the expression "modeled object" designates the data itself. According to the type of the system at use, the modeled objects may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD and PLM system, as will be apparent from the definitions of such systems provided below.

By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task).

The methods are computer-implemented. This means that the steps (or substantially all the steps) of the methods are executed by at least one computer, or any system alike. Thus, steps of the methods are performed by the computer, possibly fully automatically, or, semi-automatically. In examples, the triggering of at least some of the steps of the methods may be performed through user-computer interaction. The level of user-computer interaction required may depend on the level of automatism foreseen and put in balance with the need to implement user's wishes. In examples, this level may be user-defined and/or pre-defined.

A typical example of computer-implementation of the methods is to perform the methods with a system adapted for this purpose. The system may comprise a processor coupled to a memory and a graphical user interface (GUI), the memory having recorded thereon a computer program comprising instructions for performing the methods. The memory may also store a database. The memory is any hardware adapted for such storage, possibly comprising several physical distinct parts (e.g. one for the program, and possibly one for the database). The system may further comprise a depth sensor coupled to the processor and configured to acquire a depth map of an instance for the 3D reconstruction. The system may also comprise a posing spot for the instance to pose during the acquisition.

Figure 8:
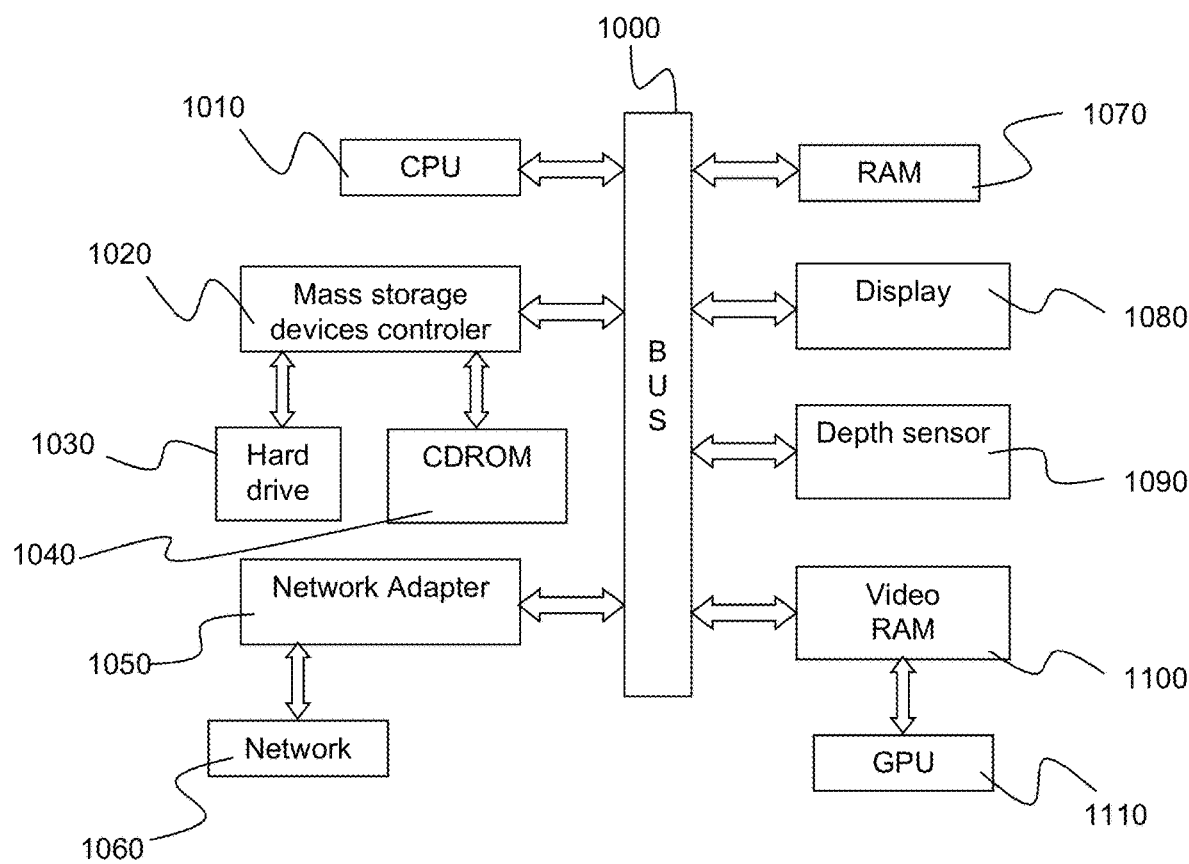
FIG. 8 shows an example of the system.

FIG. 8 shows an example of the system, as computer system connected to a depth sensor.

The system of the example comprises a central processing unit (CPU) 1010 connected to an internal communication BUS 1000, a random access memory (RAM) 1070 also connected to the BUS. The system is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The system may also include a depth sensor 1090.

The computer program may comprise instructions executable by a computer, the instructions comprising means for causing the above system to perform the methods. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

The invention claimed is:

1. A computer-implemented method for determining a function configured for adding a noise of a type of depth sensor, the type of depth sensor being a category of depth sensors of a similar or an at least substantially same constitution such that depth sensors present a similar or an at least substantially same noise, to an input depth map, the method comprising:
forming a learning dataset, the learning dataset including a plurality of noiseless depth maps each associated to a respective noisy depth map, each noiseless depth map and respective noisy depth map corresponding to a same one of a plurality of depth sensor positionings in one or more scenes, the forming including:
acquiring each noisy depth map by performing depth measurements with a physical instance of the type of depth sensor, the physical instance of the type of depth sensor being performed with a depth sensor of the type of depth sensor, and
virtually calculating each noiseless depth map by determining each noiseless depth map fully based on numerical data and without any physical acquisition; and
learning the function based on the learning dataset, the learning of the function including adjusting parameters of the function by performing machine-learning on the learning dataset such that applying the learnt function to a given noiseless depth map of the learning dataset leads to a result corresponding to the respective noisy depth map associated with the given noiseless depth map in the dataset.

2. The method of claim 1, wherein the virtually calculating each noiseless depth map is based on the corresponding depth sensor positioning and on a predetermined model of the corresponding scene.

3. The method of claim 1, wherein the forming further includes determining the corresponding depth sensor positioning from the respective noisy depth map.

4. The method of claim 3, wherein determining the corresponding depth sensor positioning from the respective noisy depth map includes identifying in the respective noisy depth map a calibration object and/or a calibration pattern.

5. The method of claim 1, wherein the plurality of depth sensor positionings includes one or more sub-pluralities of depth sensor positionings that each correspond to a respective depth from a same scene region.

6. The method of claim 5, wherein each sub-plurality of depth sensor positionings, that each corresponds to a respective depth from a same scene region, includes more than 10 depth sensor positionings.

7. The method of claim 5, wherein each sub-plurality of depth sensor positionings, that each corresponds to a respective depth from a same scene region, includes more than 50 depth sensor positionings.

8. The method of claim 5, wherein the plurality of noisy depth maps forms one or more videos.

9. The method of claim 1, wherein learning the function is performed by regression learning.

10. The method of claim 1, wherein learning the function is performed within a space of networks comprising convolutional layers and/or deconvolutional layers.

11. The method of claim 10, wherein the convolutional layers and/or deconvolutional layers implements filters each of a size inferior to 10×10.

12. The method of claim 10, wherein the convolutional layers and/or deconvolutional layers implements filters each of a size inferior to 5×5.

13. The method of claim 10, wherein the convolutional layers and/or deconvolutional layers implements filters each of a size equal to 3×3.

14. A non-transitory computer readable medium having recorded thereon a function learnable according to a computer-implemented method for determining a function configured for adding a noise of a type of depth sensor, the type of depth sensor being a category of depth sensors of a similar or an at least substantially same constitution such that depth sensors present a similar or an at least substantially same noise, to an input depth map, the method comprising:
forming a learning dataset, the learning dataset including a plurality of noiseless depth maps each associated to a respective noisy depth map, each noiseless depth map and respective noisy depth map corresponding to a same one of a plurality of depth sensor positionings in one or more scenes, the forming including:
acquiring each noisy depth map by performing depth measurements with a physical instance of the type of depth sensor, the physical instance of the type of depth sensor being performed with a depth sensor of the type of depth sensor, and
virtually calculating each noiseless depth map by determining each noiseless depth map fully based on numerical data and without any physical acquisition; and
learning the function based on the learning dataset, the learning of the function including adjusting parameters of the function by performing machine-learning on the learning dataset such that applying the learnt function to a given noiseless depth map of the learning dataset leads to a result corresponding to the respective noisy depth map associated with the given noiseless depth map in the dataset.

15. A computer-implemented method for generating a depth map based on a depth sensor positioning in a scene and on a predetermined model of the scene, the method comprising:
virtually calculating a noiseless depth map based on the depth sensor positioning and on the predetermined model of the scene; and
applying, to the calculated noiseless depth map, a function learnable according to a further computer-implemented method for determining a function configured for adding a noise of a type of depth sensor, the type of depth sensor being a category of depth sensors of a similar or an at least substantially same constitution such that depth sensors present a similar or an at least substantially same noise, to an input depth map, including:
forming a learning dataset, the learning dataset including a plurality of noiseless depth maps each associated to a respective noisy depth map, each noiseless depth map and respective noisy depth map corresponding to a same one of a plurality of depth sensor positionings in one or more scenes, the forming including:
acquiring each noisy depth map by performing depth measurements with a physical instance of the type of depth sensor, the physical instance of the type of depth sensor being performed with a depth sensor of the type of depth sensor, and
virtually calculating each noiseless depth map by determining each noiseless depth map fully based on numerical data and without any physical acquisition; and
learning the function based on the learning dataset, the learning of the function including adjusting parameters of the function by performing machine-learning on the learning dataset such that applying the learnt function to a given noiseless depth map of the learning dataset leads to a result corresponding to the respective noisy depth map associated with the given noiseless depth map in the dataset.

16. A non-transitory computer readable medium having recorded thereon a computer program comprising instructions for performing a computer-implemented method for determining a function configured for adding a noise of a type of depth sensor, the type of depth sensor being a category of depth sensors of a similar or an at least substantially same constitution such that depth sensors present a similar or an at least substantially same noise, to an input depth map, the method comprising:
forming a learning dataset, the learning dataset including a plurality of noiseless depth maps each associated to a respective noisy depth map, each noiseless depth map and respective noisy depth map corresponding to a same one of a plurality of depth sensor positionings in one or more scenes, the forming including:
acquiring each noisy depth map by performing depth measurements with a physical instance of the type of depth sensor, the physical instance of the type of depth sensor being performed with a depth sensor of the type of depth sensor, and
virtually calculating each noiseless depth map by determining each noiseless depth map fully based on numerical data and without any physical acquisition; and
learning the function based on the learning dataset, the learning of the function including adjusting parameters of the function by performing machine-learning on the learning dataset such that applying the learnt function to a given noiseless depth map of the learning dataset leads to a result corresponding to the respective noisy depth map associated with the given noiseless depth map in the dataset.

17. A computer system comprising:
a processor coupled to the memory, the memory having recorded thereon a computer program comprising instructions for performing a computer-implemented method for determining a function configured for adding a noise of a type of depth sensor, the type of depth sensor being a category of depth sensors of a similar or an at least substantially same constitution such that depth sensors present a similar or an at least substantially same noise, to an input depth map, the instructions when executed by the processor cause the process to be configured to:
form a learning dataset, the learning dataset including a plurality of noiseless depth maps each associated to a respective noisy depth map, each noiseless depth map and respective noisy depth map corresponding to a same one of a plurality of depth sensor positionings in one or more scenes, the processor being configured to form the learning dataset by being further configured to
acquire each noisy depth map by performing depth measurements with a physical instance of the type of depth sensor, the physical instance of the type of depth sensor being performed with a depth sensor of the type of depth sensor, and
virtually calculate each noiseless depth map by determining each noiseless depth map fully based on numerical data and without any physical acquisition; and
learn the function based on the learning dataset, the learning of the function including adjusting parameters of the function by performing machine-learning on the learning dataset such that applying the learnt function to a given noiseless depth map of the learning dataset leads to a result corresponding to the respective noisy depth map associated with the given noiseless depth map in the dataset.

18. The system of claim 17, wherein the processor is further configured to virtually calculate each noiseless depth map based on the corresponding depth sensor positioning and on a predetermined model of the corresponding scene.

19. The system of claim 17, wherein the processor is further configured to form the learning data set by being further configured to determine the corresponding depth sensor positioning from the respective noisy depth map.

20. The system of claim 19, wherein the processor is further configured to determine the corresponding depth sensor positioning from the respective noisy depth map by being further configured to identify in the respective noisy depth map a calibration object and/or a calibration pattern.

21. The system of claim 17, wherein the plurality of depth sensor positionings includes one or more sub-pluralities of depth sensor positionings that each correspond to a respective depth from a same scene region.

22. The system of claim 21, wherein each sub-plurality of depth sensor positionings, that each corresponds to a respective depth from a same scene region, includes more than 10 depth sensor positionings.

23. The system of claim 21, wherein each sub-plurality of depth sensor positionings, that each corresponds to a respective depth from a same scene region, includes more than 50 depth sensor positionings.

24. The system of claim 21, wherein the plurality of noisy depth maps forms one or more videos.

* * * * *